United States Patent [19]
Adams et al.

[11] 3,720,103
[45] March 13, 1973

[54] HEAT FLUX MEASURING SYSTEM

[75] Inventors: Donald E. Adams, Williamsville; Franklin A. Vassallo, Lancaster, both of N.Y.

[73] Assignee: Cornell Aeronautical Laboratory, Inc., Buffalo, N.Y.

[22] Filed: Nov. 3, 1970

[21] Appl. No.: 86,552

[52] U.S. Cl. .............................................. 73/190 H
[51] Int. Cl. ............................................ G01k 17/00
[58] Field of Search ..................... 73/15, 190, 340 HF

[56] References Cited

UNITED STATES PATENTS

| | | | |
|---|---|---|---|
| 3,217,538 | 11/1965 | Loeb | 73/190 |
| 3,256,734 | 6/1966 | Storke | 73/193 |
| 3,367,182 | 2/1968 | Baxter | 73/190 |
| 3,267,728 | 8/1966 | Solomons | 73/190 |

FOREIGN PATENTS OR APPLICATIONS

| | | | |
|---|---|---|---|
| 442,294 | 3/1927 | Germany | 73/190 |

*Primary Examiner*—Richard C. Queisser
*Assistant Examiner*—Herbert Goldstein
*Attorney*—Allen J. Jaffe

[57] ABSTRACT

A heat flux meter having thermocouples responsive to temperature differentials between two similar surfaces, the heat flux to one of which is to be determined, a first heater responsive to the thermocouples for heating the other surface, a second heater responsive to temperature differences between it and the first heater to prevent heat flow away from the other surface and a reflective shield for preventing environmental heat flow to the other surface.

5 Claims, 1 Drawing Figure

PATENTED MAR 13 1973 3,720,103
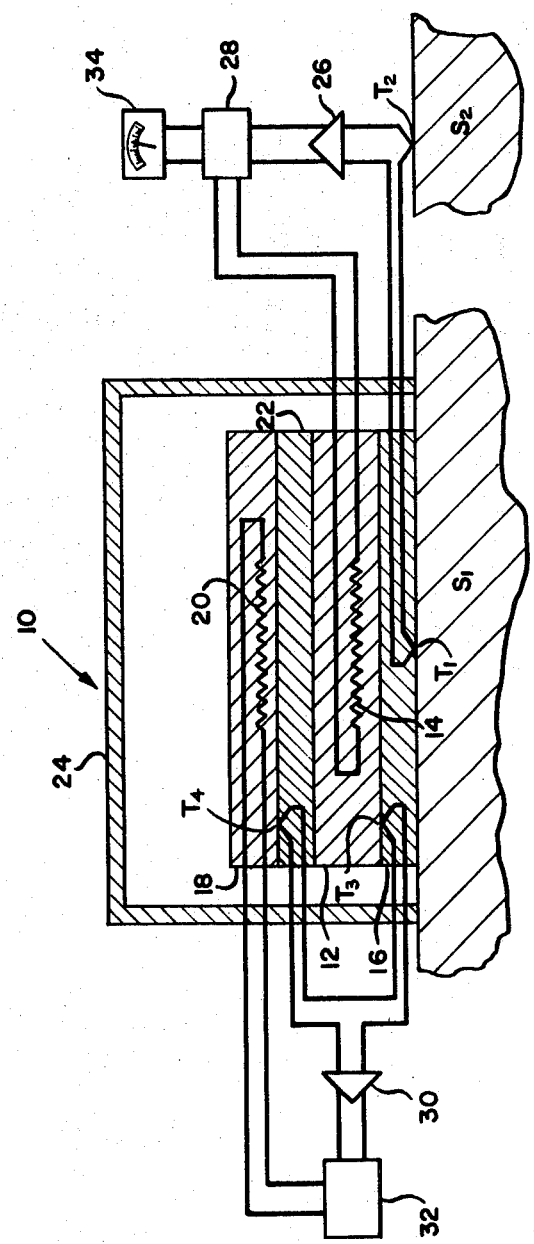
INVENTOR
FRANKLIN A. VASSALLO
DONALD E. ADAMS
BY
ATTORNEY

HEAT FLUX MEASURING SYSTEM

BACKGROUND OF THE INVENTION

The present invention relates to a heat flux measuring system, and, more specifically, to a heat flux sensor for measuring the thermal flux from a combined radiation and convection heat source to any surface independent of the emissivity or thermal characteristics thereof.

Prior to flight tests of advanced aerodynamic structures, structural tests under simulated flight conditions are generally necessary. Laboratory tests of simulated aerodynamic heating may be conducted by heating the test structure with a radiation source that provides the same rate of heating as calculated for actual flight.

Presently, thermal flux sensors are known for controlling the thermal environment, but these are dependent upon a knowledge of the test structure's thermal properties. One type of sensor bases its operation on a temperature drop across a material of known thermal properties whereas a second type bases its operation on the rate of temperature rise in a material of known heat capacity. These techniques require that the thermal properties and surface emissivity of the heated material be known. The surface temperature of the sensor may also be at a different temperature than the surface to be measured, resulting in errors in thermal flux measurement.

A more unusual thermal sensor is the isothermal heat meter. This sensor consists of two resistive heating elements located at opposite ends of a rod or composite of rods. One end of the rod is well insulated whereas the other is exposed to the heat load to be measured. In operation, the exposed end is maintained at the vehicle skin temperature by applying a regulated amount of power to its surface heater. At the same time, the unexposed end is also maintained at the skin temperature using a similar heater. Under this symmetrical heating pattern, the net heat inflow is simply the difference in electrical energy applied to the rod ends. Because the sensor is always maintained equal in temperature to that of the skin, the net heat inflow to the sensor is also that to the skin. However, for radiation heating, the surface of the meter must have the same emissivity as the structure surface. If this emissivity is not known or if it varies during a heating cycle and cannot be made the same on the meter as on the structure, the meter will not be capable of measuring the thermal flux during radiation heating.

SUMMARY OF THE INVENTION

The foregoing disadvantages of prior devices are overcome according to the principles of the present invention which provides a thermal flux meter for measuring the thermal flux from a heat source to any surface independent of the emissivity or thermal properties of that surface.

The thermal flux meter according to the present invention is based on the principle that a surface temperature depends only on the net surface heat flux and the internal characteristics of the surface and not on the manner in which the heat is introduced. Thus, if one first surface is heated to maintain its temperature equal to that of a second adjacent or remote, similar surface, the heat input to which is to be determined, and the heat from the heat source for the first surface is absorbed only by the first surface then the heat flux to the first surface is equal to the unknown heat flux to the second surface.

In accordance with the present invention a heater supplies heat to the first surface in accordance with the temperature differential between the first and second surface. To insure that all the heat absorbed by the first surface is due to the heater and that all the heat from the heater goes to the first surface, a highly reflective shield is provided between the environment and the first surface and a second heater is provided between the shield and the first heater which eliminates any heat flux between the two heaters.

Basically then, the present invention comprises; first thermal sensing means for generating a first signal responsive to the heat input to a first surface; second thermal sensing means for generating a second signal responsive to the heat input to a second surface which is similar to the first surface; first heating means for applying heat to the first surface in response to the first and second signals; and means for shielding the first surface from the environment whereby the heat input to the first surface is equal to the heat input to the second surface.

BRIEF DESCRIPTION OF THE DRAWING

For a fuller understanding of the present invention reference should now be had to the following description of the same taken in conjunction with the accompanying drawing wherein the only FIGURE is a schematic sectional view of the flux meter with the circuitry shown in block form.

DESCRIPTION OF A PREFERRED EMBODIMENT

Referring now to the drawing the thermal flux meter is generally depicted by the numeral 10 and comprises a first heater 12, which may have a resistive heating element 14 embedded therein. Heater 12 is bonded or otherwise suitably secured to a surface $S_1$ of a test vehicle or the like by means of a thin bonding agent 16 of high thermal conductance.

A second heater 18, which may have a resistive heating element 20 embedded therein, is bonded or secured to the first heater 12 by means of a securing or bonding element 22 of low thermal conductivity such as aluminum oxide. A rectangular, highly reflective shield 24 is provided as an enclosure for surface $S_1$ and heaters 12 and 18. Shield 24 may be fabricated of stainless steel having a gold coating.

A first thermal sensor, such as thermocouple $T_1$, is provided at surface $S_1$. A second thermal sensor, such as thermocouple $T_2$, is provided at a surface $S_2$, the heat flux to which is to be measured. Surface $S_2$ has internal characteristics similar to those of surface $S_1$ and may be located adjacent to $S_1$ or at a distance remote therefrom. Second and third thermal sensors in the form of thermocouples $T_3$ and $T_4$ are located in heaters 12 and 18 to respond to the heat differential between the heaters.

The manner in which the heat flux meter operates to determine the heat flow to surface $S_2$ will now be described. Thermocouples $T_1$ and $T_2$ generate signals which are indicative of the temperatures at surfaces $S_1$ and $S_2$, respectively. The difference between these signals is amplified by suitable amplifier 26, the output from which is fed into a power source 28 for actuating heating element 14. Heating element 14 will thus function to maintain the temperature $T_1$ at surface $S_1$ equal to the temperature $T_2$ at surface $S_2$. Since surface $S_1$ is similar to surface $s_2$ and has the same internal characteristics, the power generated at 28 will be a function of the unknown heat flux to $S_2$ when $T_1$ equals $T_2$ only if substantially all of the heat generated by heater 12 is delivered to surface $S_1$. It is also essential that substantially all the heat absorbed at surface $S_1$ is due to that delivered only by heater 12. To insure that all the heat from heater 12 flows to surface $S_1$, heater 18 is actuated by power source 32 and amplifier 30 to maintain $T_3$ equal $T_4$. When $T_3$ equals $T_4$ no heat can flow from heater 12 upward toward heater 18. To insure that all of the heat delivered to surface $S_1$ is due to heater 12 and not from the environment, shield 24 functions to reflect the heat from the environment away from the internal parts of the meter and surface $S_1$. A suitable indicator 34 can be provided to indicate the power output of 28 in terms of the heat flux to surface $S_2$.

Although a preferred embodiment of the present invention has been described, changes will obviously occur to those skilled in the art. It is therefore intended that the invention is to be limited only by the scope of the appended claims.

We claim:

1. A thermal flux meter, comprising;
   a. first temperature sensing means for generating a first signal responsive to the heat input to a first surface,
   b. second temperature sensing means for generating a second signal responsive to the heat input to a second surface which is similar to said first surface,
   c. first heating means for applying heat to said first surface in response to the difference between said first and second signals,
   d. means for preventing heat flow to said first surface from the environment and for preventing heat flow from said first heating means to the environment including second heating means responsive to the temperature difference between said first heating means, and the second heating means and further including reflective means for shielding said first surface from the environment,
   e. said last mentioned means is spaced from said second surface whereby heat flow can occur directly between the environment and said second surface.

2. The meter according to claim 1 wherein;
   f. said first heating means is secured to said first surface by an element of high thermal conductance, and
   g. said second heating means is secured to said first heating means by a second element of low thermal conductivity.

3. The meter according to claim 2, wherein;
   h. said first and second heating means include resistive heating elements, and
   i. said temperature sensors comprise thermocouples.

4. The meter according to claim 1, further comprising;
   f. means for controlling the heat output of said second heating means comprising third and fourth thermal sensing means responsive to temperature differential between said first and second heating means.

5. The meter according to claim 4, wherein;
   g. said first and second heating means include resistive heating elements, and
   h. said temperature sensors comprise thermocouples.

* * * * *